Feb. 16, 1971     W. L. HICKLIN     3,564,493

ACOUSTIC ENERGY DETECTION SYSTEM

Filed Aug. 28, 1968     2 Sheets-Sheet 1

INVENTOR.
WILLIAM L. HICKLIN
BY
ATTORNEYS

United States Patent Office 3,564,493
Patented Feb. 16, 1971

3,564,493
ACOUSTIC ENERGY DETECTION SYSTEM
William L. Hicklin, Doylestown, Pa., assignor to the United States of America as represented by the Secretary of the Navy
Filed Aug. 28, 1968, Ser. No. 756,350
Int. Cl. G08b 13/16
U.S. Cl. 340—15
16 Claims

ABSTRACT OF THE DISCLOSURE

An acoustic energy system for passively detecting and distinguishing between ground vehicle sounds and aircraft sounds and for transmitting radio signals indicative of the ground vehicle sounds. The system includes an adaptive amplifier and detector circuit for detecting both ground vehicle and aircraft generated sounds and responding thereto for providing a first control signal, an adaptive amplifier and detector circuit primarily responsive to the more impulsive aircraft generated sounds for providing a second control signal, and transmitter ON-OFF control circuitry responsive to the first and second control signals for activating a transmitter to transmit ground vehicle sound signals and for deactivating the transmitter in the presence of aircraft sounds.

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates generally to input signal characteristic detectors and, further, to acoustic energy responsive systems and, still more particularly, to such systems which are capable of distinguishing between acoustic energy having frequency components lying in the same frequency band and having differing impulsiveness characteristics such as those generated by ground vehicles and aircraft.

Known D.C. powered acoustic energy relaying systems designed to be responsive to ground vehicle generated sound for transmitting indicia thereof have drastically shortened periods of usefulness because passing aircraft can actuate such systems and quickly use up the available power supply energy. A satisfactory solution to the problem is greatly complicated by the fact that the acoustic energy signals generated by both ground vehicles and aircraft generally have primary frequency components of interest lying in the same frequency band. Additionally, remote monitoring stations receive a great deal of undesired data during periods of aircraft activity adjacent the known sound responsive systems.

SUMMARY OF THE INVENTION

It is a general purpose of this invention to provide means which, in effect, can discriminate between ground vehicle generated and aircraft generated acoustic energy in order to cause a system transmitter to be actuated only in the presence of ground vehicle generated acoustic energy. Briefly, the general purpose of this invention may be accomplished by providing a first circuit such as an adaptive amplifier and detector unit responsive to the acoustic energy generated by both ground vehicles and aircraft for producing a first control signal used to actuate a system transmitter and a second circuit such as an adaptive amplifier and detector unit primarily responsive to aircraft generated acoustic energy for producing a second control signal used to disable the system transmitter. More particularly, the invention contemplates apparatus including signal impulsiveness detection means and, further, one wherein sensed aircraft acoustic energy disables the system transmitter for a predetermined time period. Additionally, the invention contemplates a system wherein are used detectors and adaptive amplifiers having automatic gain control circuitry responding at different respective attack rates enabling discrimination between aircraft and ground vehicle generated acoustic energy with a high degree of reliability.

DESCRIPTION OF THE PREFERRED EMBODIMENT

Figure 1B:
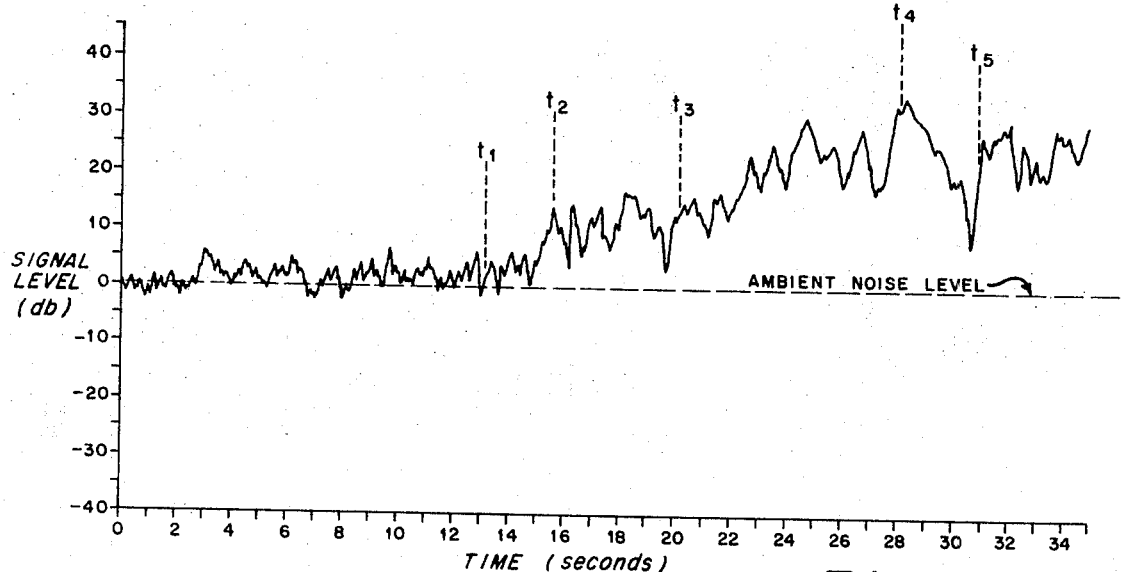
FIGS. 1A and 1B represent mechanically recorded time diagrams of acoustic signal levels.
Figure 1A:
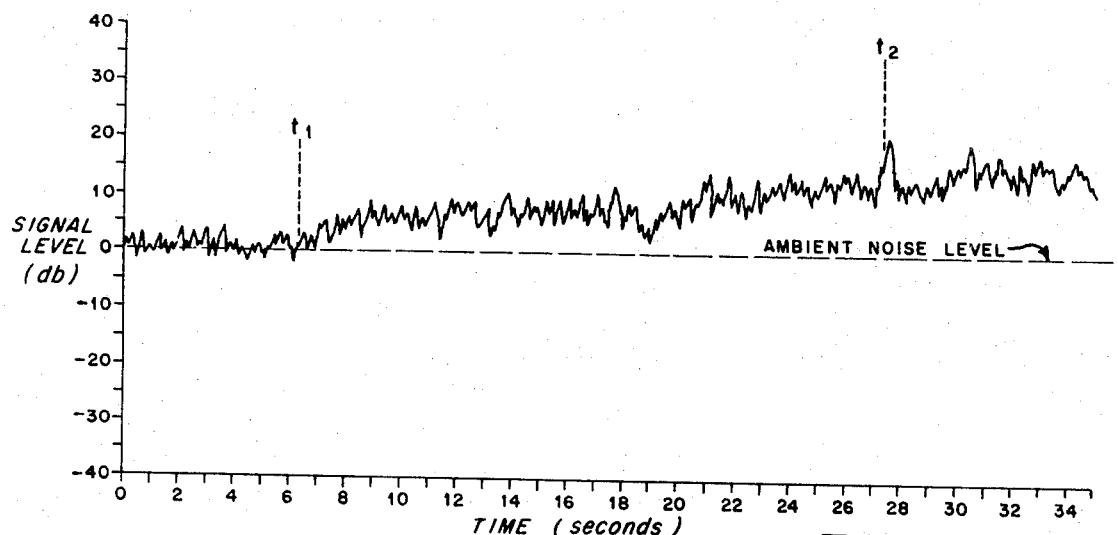
Figure 2:
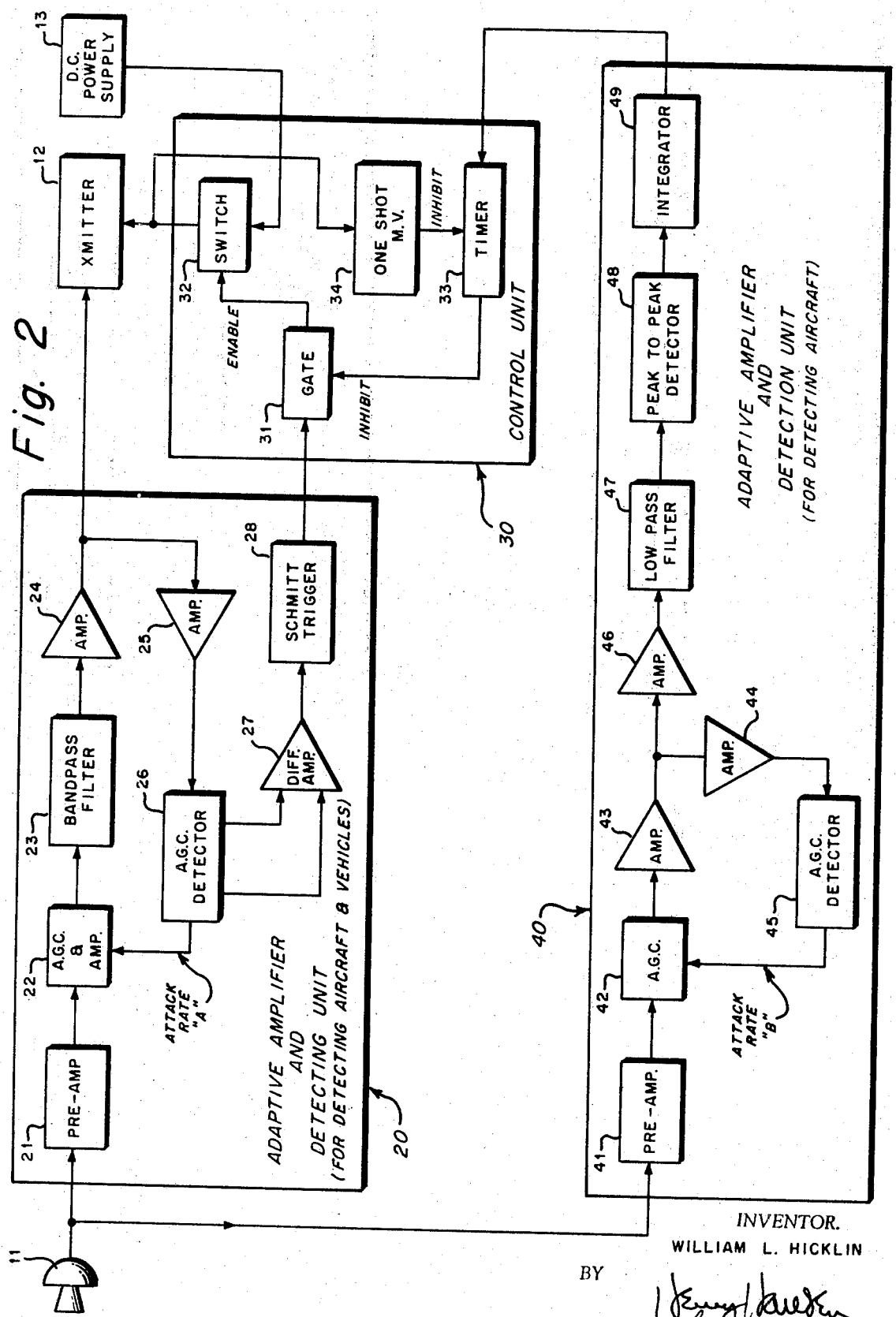
FIG. 2 represents a block diagram of apparatus according to the invention.

The invention may be first understood by referring to FIG. 1A wherein the time diagram represents a mechanical time recording of the output signal level in db vs. time in seconds of a microphone 11 in the apparatus of FIG. 2 which level is initially attributable to the ambient noise level and to which is added, as at time $t_1$, additional acoustic energy contributed by a passing ground vehicle such as a truck. Similarly, in FIG. 1B, the time diagram represents a mechanical recording of the output acoustic signal level in db vs. time in seconds as affected at time $t_1$ by an approaching and passing aircraft. It has been discovered that the aircraft-affected acoustic signal level is characterized by greater impulsiveness, i.e., much larger variations in the sound pressure level excessive of predetermined excursions about the tracked or average increasing value on the order of 10 db and occurring within a predetermined short period of time such as 0.2 of a second, than is the truck-affected signal level. The aircraft-affected signal level has several instances in an eighteen second period as shown such as at times $t_2$, $t_3$, $t_4$, and $t_5$ of FIG. 1B wherein the trough-to-peak excursions exceed 10 db in a two-tenths second time period. Even though the signals of the truck and the aircraft have detectable frequency components which lie in the same frequency band, it has been discovered that differentiation between signal types is possible by exploiting the above-indicated difference in impulsiveness of the signals attributable to aircraft and to ground vehicles such as trucks.

Referring now to FIG. 2, the audio output signal of the microphone 11, in general, after some processing including filtering and amplification is applied to a transmitter 12 which functions to transmit the audio signal being sensed to a remote monitoring station (not shown) when interconnected to its D.C. power supply 13 such as a battery by control means hereinafter described. More particularly, the audio signal from the microphone 11 is applied to an adaptive amplifier and detector unit 20 for detecting acoustic energy generated both by ground vehicles such as trucks and by aircraft. Generally, the unit 20 includes at its input stage an audio preamplifier 21 whose electrical output signal is applied to an automatic gain control and amplifier circuit 22 of, for example, the current controlled attenuator type whose gain adjusted output signal, in turn, is applied through a bandpass filter 23 to an audio amplifier 24. The audio output signal of the amplifier 24 is applied both to the transmitter 12 for transmission, if appropriate, and to an amplifier 25 whose output signal in turn is applied to an automatic gain control detector 26 of the type suitable for controlling the gain of the circuit 22.

The attack rate A of the AGC loop including the amplifier 25 and the detector 26 is preferably set at a low enough level such as about 0.17 db/sec. for enabling changes in the ambient noise level attributable to wind, rain, wildlife and the like to cause corresponding changes in the gain of the circuit 22 so that the amplifiers 24 and 25 provide output signals of substantially constant levels and for enabling the additional superimposed energy of acoustic signals from passing vehicles to increase the level of the output signal of the amplifiers 24 and 25 a sufficient degree to cause the trigger 28 to be fired. The preamplifier includes a prewhitening network to flatten the ambient background noise for better detection probability. The bandpass filter 23 is designed to eliminate unwanted frequency components in the audio signal to be transmitted to facilitate signal interpretation by observers at the remote sensing station.

One suitable type of AGC detector 26 generally includes a rectifier whose output signal is applied through a low-pass filter and a load resistor to a Miller integrator, none of which are shown. The voltage drop across the load resistor is applied to a differential amplifier 27 whose output signal is applied to fire, when it exceeds a predetermined threshold level, a Schmitt trigger 28 which provides its high level or ON control signal to a transmitter ON-OFF control unit 30. The triggering level of the trigger 28 is set so that the ON output signal is produced during the times when either a vehicle or an aircraft is passing through the area monitored by the microphone 11. One suitable threshold level is about 5 db±0.5 db.

The control unit 30 includes a gate 31 which applies the ON signal from the trigger 28 to enable a transmitter power supply switch 32 unless the gate 31 is being inhibited by a duration-controlled output signal of a timer 33. The voltage level on the transmitter adjacent side of the switch 32 is applied to a one-shot multivibrator 34 providing an output signal which appears when the switch 32 is enabled and which is applied to inhibit the timer 33 from producing its gate-inhibiting signal for a one-second interval during which the timer actuating signal may drop below a predetermined timer actuating level. The gate-inhibit signal has a duration extending twelve to twenty seconds after each actuation of the timer 33 depending upon the degree of reliability that only aircraft sounds are being detected by a detection unit 40. The timer 33 responds to the output control signal of the adaptive amplifier and detector unit 40 for detecting aircraft which also receives and responds to the output signal of the microphone 11.

The unit 40 includes a preamplifier 41 whose output signal is applied to an automatic gain control 42 which, for greater stability, is conveniently of the voltage-controlled attenuator type. The output signal from the automatic gain control 42 is applied to an audio amplifier 43 whose output signal is applied to another audio amplifier 44 whose output signal, in turn, is applied to an AGC detector 45 which supplies a gain controlling voltage to the control 42. The attack rate B of the AGC loop including the amplifier 44 and detector 45 is set to be much faster than the attack rate A of the unit loop including the AGC detector 26. While an attack rate B for the unit 40 on the order of 6 to 8 db/sec. has been found to be satisfactory, an attack rate on the order of 10 db/sec. is preferred so that the unit 40 can just follow the envelopes of vehicle generated acoustic signals and fail to follow the envelope of the more impulsive aircraft generated signal. The charge and discharge time constants of the detector 45 are made as fast as the bandwidth can accommodate so that detections can be made by the unit 40 on excursions around the envelope of the aircraft generated signal.

In order to detect aircraft generated signals, the audio output signal of the amplifier 43 also is applied through another audio amplifier 46 and a low-pass filter 47 to a detector 48 which provides an aircraft detection output signal when its filtered input signal exceeds a predetermined threshold level. The function of the low-pass filter 47 is to eliminate or block high frequency noises excessive of about 1.5 kHz. which are attributable to wind, rain and wildlife including birds and insects. A convenient design for the filter 47 is to have a rolloff characteristic which is down three db at 300 Hz. and rolls off at a rate of six db per octave since the primary acoustic signal frequency components of interest are less than 400 Hz. The detector 48 is conveniently of the peak-to-peak type detector. A suitable threshold level for the detector 48 is about 6 db ±0.5 db.

While the output signal of the detector 48 may be directly applied to actuate the timer 33 to begin providing its duration-controlled output signal, it is preferred for increased reliability of vehicle detection that the detector output signal be applied to an integrator 49 designed to provide an OFF output signal of suitable level for activating the timer 33 when, for example, at least two or three detector output signals generally indicative of an aircraft detection are provided within a 10 to 15 second time period. This may be conventionally accomplished by control of the discharge time constants of the integrator 49. The integrator 49 thereby can help to reduce the probability of activation of the timer 33 when, for example, a truck changes gears in close proximity to the microphone 11 as at time $t_2$ of FIG. 1A which sudden increase in the acoustic signal level is detected by the detector 48. Therefore, while the integrator 4a may allow transmission of the aircraft signal for a short period of time, as from prior to $t_2$ to $t_3$ of FIG. 1B, transmission of the truck signal is not interrupted for the relatively long period of twelve seconds when gears are changed. The duration of the gate-inhibit signal provided by the timer 33 may be increased as to twenty seconds when optimum threshold and attack rate values are used for the units 20 and 40 and when an integrator 49 is provided for activating the timer when three detections by the detector 48 are made in a fifteen-second period. Elimination of the integrator 49 decreases the probability that the system may transmit spurious aircraft signals but makes possible the appearance of gaps in the transmission of the desired truck signals.

The amplifier 44 is satisfactorily operated near its saturation point when AGC loop of the unit 40 is tracking an aircraft signal. The described configuration therefore enables the use of smaller amplifiers requiring power of lesser voltages and greatly reduces power consumption particularly when the system is passively processing ambient noise type acoustic signals.

The timer 33 responds to the OFF signal provided by the unit 40 to provide to the gate 31 an inhibiting signal for a period of about 12 to 20 seconds which is conveniently set to have a duration approximately equal to the anticipated duration of an aircraft generated acoustic signal, e.g., the fly-by time. Each succeeding detection by the detector 48 with the 12-second period causes the timer 33 to provide the gate-inhibiting signal for an additional twelve to twenty-second period. Thus, for the example of the aircraft actuated signal of FIG. 1B, the gate 31 will be inhibited from time $t_3$ to twelve seconds after time $t_5$.

The one-shot multivibrator 34, as indicated above, provides a timer inhibiting signal which causes the timer 33 to fail to produce its gate-inhibiting signal for a period of one second.

Thus, potential transient voltages which could appear when the transmitter 12 is initially turned ON do not cause the timer 33 to function by triggering the detector 48 when a vehicle is initially detected by the unit 20 and the switch 32 is initially enabled through the gate 31 by the trigger 28.

The considerations involved in selecting the attack rates for the AGC loops of the units 20 and 40 and the threshold levels are quite important to the proper functioning of the invention. For example, the AGC loop of unit 20 conveniently has an optimum attack rate on the order of about 0.17 db/sec. within a range of about 0.14 to 0.20 db/sec. in order to assure that the acoustic signals of approaching and departing ground vehicles are not excluded while the trigger level of the trigger 28 is set so that an ON control signal is produced when the signal level exceeds an optimum value of about 5 db in a range of 4 to 6 db above the gain controlled signal level. If the attack rates and trigger level are set below the above-noted ranges, false alarms occur. Many vehicle signals will not be detected if the attack rate and trigger level are set above the indicated ranges, and the desired degree of reliability of the system will be impaired. Since the aircraft acoustic signals are more impulsive than the ground vehicle signals, in the presence of both ground vehicle and aircraft acoustic signals, the Schmitt trigger 28 of the unit 20 applies the ON control signal to the gate 31 of the control unit 30.

On the other hand, the AGC loop of the unit 40 has an attack rate on the order of 10 db/sec. within a range of about 8 to 12 db/sec. so that the occurrences of the extreme impulsiveness in the aircraft generated acoustic signal may be detected. The threshold level of the detector 48 is set so that a detector output signal will be produced when the signal level exceeds an optimum value of about 6 db in a range of 5 to 7 db above the gain controlled signal level achieved by the unit 40. If the attack rate and threshold level of the unit 40 are set below the above-indicated ranges, instances of greater truck signal impulsiveness will be detected and treated as though an aircraft were present. On the other hand, if the attack rate and threshold level are set above the indicated ranges, many aircraft signals will not cause the desired production of the OFF control signal and undesired data will be transmitted. In the case of the aircraft-generated signal, the detector 48 of the unit 40 provides its high level output signal at times $t_2$–$t_5$ of FIG. 1B, and the integrator 49 activates the timer 33 as at time $t_3$ to provide the inhibiting signal to the gate 31. Therefore, the switch 32 is no longer enabled and the transmitter 12 is disconnected from the D.C. power supply 13.

The level of the signal attributable to ambient noise and ground vehicles only being applied through the filter 47 is insufficient to cause the detector 48 to provide its high level output signal which when integrated would have a sufficient level to activate the timer 33. Therefore, the timer 33 does not provide the inhibiting signal to the gate 31, and the gate 31 continues to apply the output signal of the Schmitt trigger 28 to enable the switch 32 to maintain the interconnection of the D.C. power supply 13 with the transmitter 12 for facilitating signal transmission.

The acoustic signal attributable to ground vehicles may be sufficient as at time $t_2$ of FIG. 1A to cause an increase in the sound level on the order of 6 db at a rate excessive 10 db/sec. such as when the truck is changing gears. Since the incidence of such sudden sound level increases is less than two in ten seconds, the output signal of the integrator 49 does not attain the level required to trigger the timer 33. Because the gate 31 is not inhibited, the transmitter 12 continues to transmit the audio signal from the amplifier 24 to the remote station.

The control and amplifier circuit 22 may be of the voltage-controlled attenuator type like that in the unit 40. For example, the output signal of the amplifier corresponding to 43 would be applied additionally to the transmitter 12. Because of the greater stability of the voltage-controlled type and because the current-controlled type inherently adds a gain such as 2 db to the signal being detected, the last described arrangement is preferred where the magnitude of the anticipated dynamic range of the ambient noise level is not critical to system design.

From the above, the invention provides circuitry enabling the transmitter 12 to transmit indicia of acoustic signals usually attributable only to ground vehicles and not those attributable to aircraft. Thereby the life of the system is greatly increased in that the D.C. power supply 13 is not sapped of all its energy by reason of the transmission of spurious acoustic signals attributable to aircraft. Additionally, at the remote monitoring station, generally only the signals attributable to ground vehicles are received. The invention greatly increases the probability of detection of ground vehicles and enables the differentiation between aircraft signals and vehicle signals with a high degree of reliability.

It should be understood, of course, that the foregoing disclosure relates only to preferred embodiments of the invention and that numerous modifications or alterations may be made without departing from the spirit and scope of the invention.

What is claimed is:

1. Apparatus comprising:
   first detector means including a first threshold detector for providing a first control signal and first automatic gain control means having a first attack rate for receiving an input signal of variable impulsiveness and actuating said first threshold detector;
   second detector means including a second threshold detector for providing a second control signal and second automatic gain control means having a second attack rate greater than said first attack rate for receiving said input signal and actuating said second threshold detector in response to said input signal exceeding a predetermined degree of impulsiveness; and
   control means connected to receive said first and second control signals for normally providing an actuating signal in response to said first control signal and being inhibited by said second control signal.

2. Apparatus according to claim 1 wherein at least one of said first and second detector means includes:
   automatic gain control means of the voltage attenuator type responsive to a gain control voltage connected to receive said input signal and provide a gain controlled output signal;
   first, second and third amplifier means, said first amplifier means being connected to receive and amplify said gain controlled output signal and said second and third amplifier means each being connected to receive and amplify the output signal of said first amplifier means; and
   automatic gain control detector means connected to receive the output signal of said second amplifier means for providing said gain control voltage to said voltage attenuator means;
   said threshold detector means being responsive to the output signal of said third amplifier means for providing an output signal when said third amplifier output signal exceeds a predetermined threshold level.

3. Apparatus according to claim 2 wherein:
   said threshold detector comprises a threshold detector of the peak-to-peak type.

4. Apparatus according to claim 1 wherein said control means comprises:
   gating means responsive to a gate-inhibit signal and connected to receive said first control signal for normally providing said actuating signal; and
   timer means connected to said gating means and to said second detector means for providing said gate-inhibit signal having a predetermined duration to said gating means in response to said second control signal.

5. Apparatus according to claim 4 wherein said second detector means further comprises:
   integrator means connected to receive said output signal of said thershold detector for providing said second control signal when a predetermined number of detector output signals are provided in a predetermined time interval.

6. Apparatus according to claim 4 wherein said control means further comprises:
   a one-shot multivibrator connected to receive said actuating signal and responsive thereto for providing a timer inhibit signal of predetermined duration;
   said timer means being connected to receive said timer inhibit signal and being inhibited thereby from providing said gate-inhibit signal.

7. Apparatus according to claim 1 wherein:
said apparatus further comprises
sensor means for sensing acoustic signals including ground vehicle generated sounds and aircraft generated sounds and for providing said input signal to said first and second detector means,
transmitter means for transmitting an audio input signal, and
power supply means for providing power for driving said transmitter means;
said first automatic gain control means is connected to provide an audio input signal to said transmitter means; and
said control means includes switch means interposed between said transmitter means and said power supply means for applying said driving power to said transmitter means in response to said first control signal and for disconnecting said power supply means from said transmitter means in response to said second control signal.

8. Apparatus according to claim 7 wherein:
said first automatic gain control means has said first attack rate calculated to enable said gain control means to actuate said first threshold detector in response to said input signal including vehicle generated sounds exceeding the ambient noise level; and
said second automatic gain control means has said second attack rate calculated to enable said gain control means to actuate said second threshold detector in response to said input signal including aircraft generated sounds exceeding the ambient noise level.

9. Apparatus according to claim 8 wherein:
second automatic gain control means has said second attack rate having a magnitude on the order of sixty times said first attack rate of said first automatic gain control means.

10. Apparatus according to claim 8 wherein:
said first gain control means has said first attack rate having a magnitude on the order of tenths of decibels per second; and
said second gain control means has said second attack rate having a magnitude on the order of tens of decibels per second.

11. Apparatus according to claim 10 wherein:
said first attack rate has a magnitude in the range of 0.14 to 0.20 decibels per second;
said second attack rate has a magnitude in the range of eight to twelve decibels per second;
said first threshold detector has a trigger level set to enable provision of said first control signal when an excursion in the level of said input signal adjusted by said first gain control means exceeds a predetermined level in the range of four to six decibels; and
said second threshold detector has a trigger level set to enable provision of said second control signal when an excursion in the level of said input signal adjusted by said second gain control means exceeds a predetermined level in the range of five to seven decibels.

12. Apparatus according to claim 8 wherein said second detector means includes:
automatic gain control means of the voltage attenuator type responsive to a gain control voltage and connected to receive said input signal and provide a gain controlled output signal;
first, second and third amplifier means, said first amplifier means being connected to receive and amplify said gain controlled output signal and said second and third amplifier means each being connected to receive and amplify the output signal of said first amplifier means; and
automatic gain control detector means connected to receive the output signal of said second amplifier means for providing said gain control voltage to said voltage attenuator means;
said threshold detector means being responsive to the output signal of said third amplifier means for providing its output signal when said third amplifier output signal exceeds a predetermined threshold level.

13. Apparatus according to claim 12 wherein said second detector means further comprises:
integrator means connected to receive said output signal of said threshold detector for providing said second control signal when a predetermined number of detector output signals are provided in a predetermined time interval.

14. Apparatus according to claim 12 wherein said control means further comprises:
gating means inhibitable by a gate-inhibit signal and connected to receive said first control signal for normally actuating said switch means; and
timer means connected to said gating means and to said second detector means for providing said gate-inhibit signal to said gating means in response to said second control signal, said gate-inhibit signal having a duration corresponding to a predetermined duration of an acoustic signal generated by passing aircraft.

15. Apparatus according to claim 14 wherein said second detector means further comprises:
a low pass filter interposed between said third amplifier means and said second threshold detector means for blocking input signal components excessive of about 1.5 kilohertz.

16. Apparatus according to claim 14 wherein said first detector means includes:
current controlled attenuator means connected to receive said input signal and providing a controlled output signal;
amplifier means connected to said attenuator means for providing an amplified controlled output signal to said transmitter;
automatic gain control detector means connected in a feedback control loop for receiving said amplified controlled output signal and for providing in response thereto a gain control current to said attenuator means;
means connected to said automatic gain controlled detector means for providing a level indicating signal indicative of the level of said amplified controlled output signal; and
Schmitt trigger means connected to receive said level indicating output signal for providing said first control signal when said level indicating output signal exceeds a predetermined threshold level.

References Cited

FOREIGN PATENTS 3,341,810 9/1967 Wallen _____ 340—15X

RODNEY D. BENNETT, Jr., Primary Examiner

D. C. KAUFMAN, Assistant Examiner

U.S. Cl. X.R.

340—16, 258, 261